Oct. 7, 1941.  E. C. HORTON ET AL  2,258,010
WINDSHIELD CLEANER
Filed Sept. 30, 1938  2 Sheets-Sheet 1
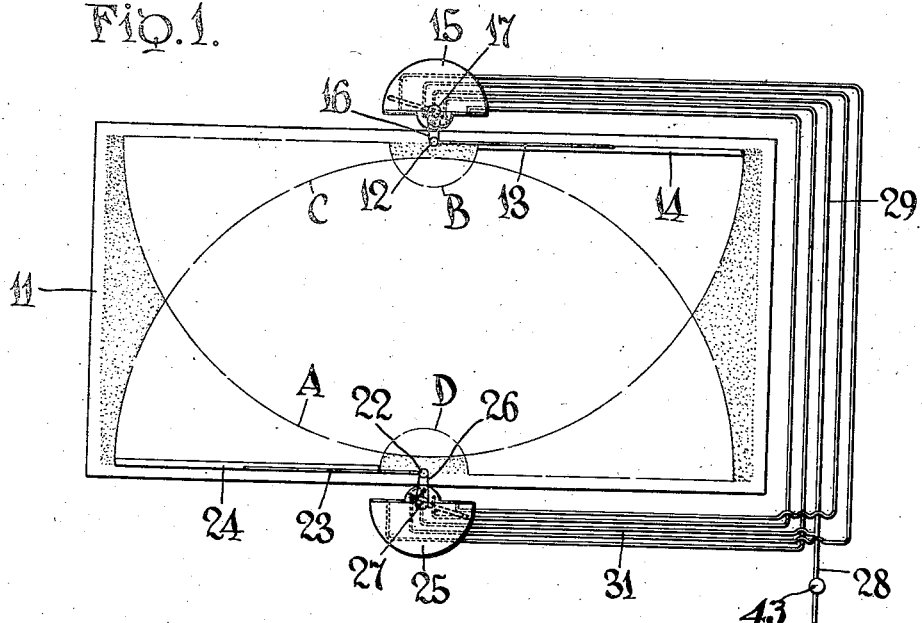
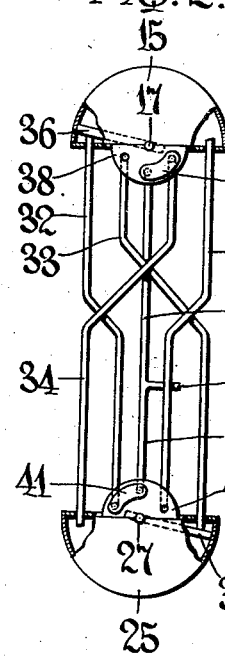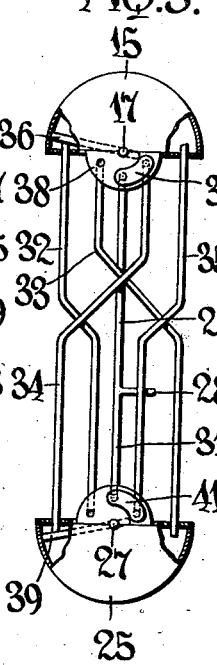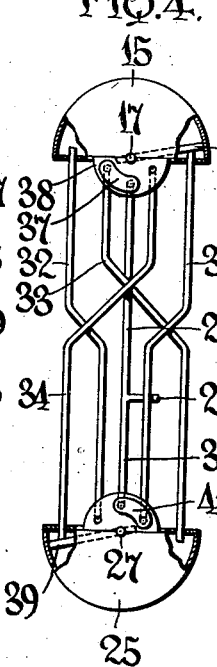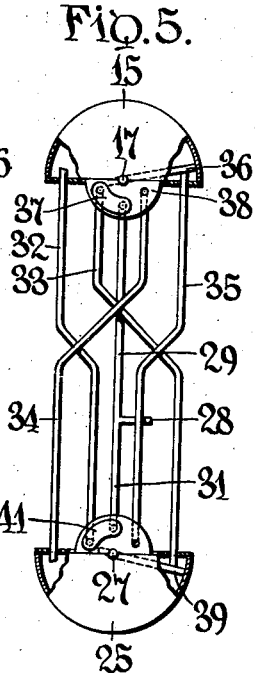
INVENTORS
Erwin C. Horton &
Raymon F. Rousseau,
BY
Bean, Brooks, Buckley & Bean.
ATTORNEYS

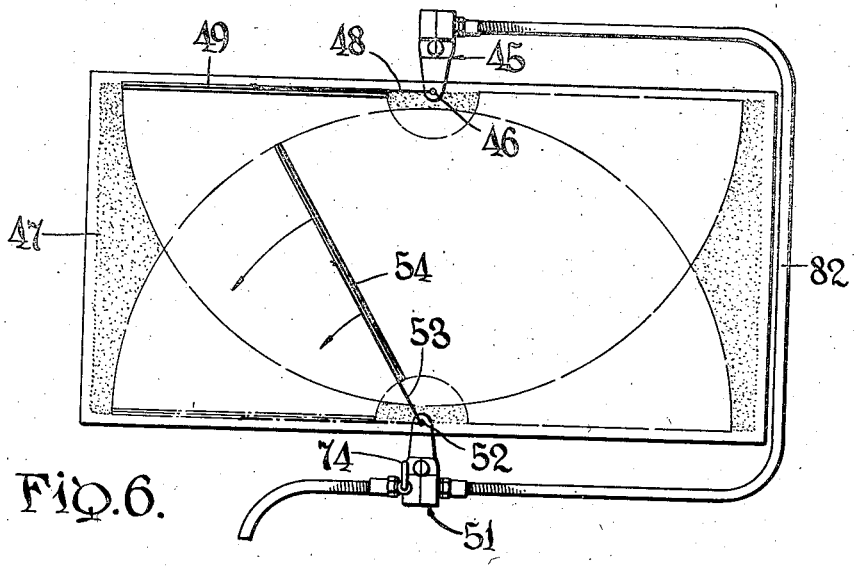
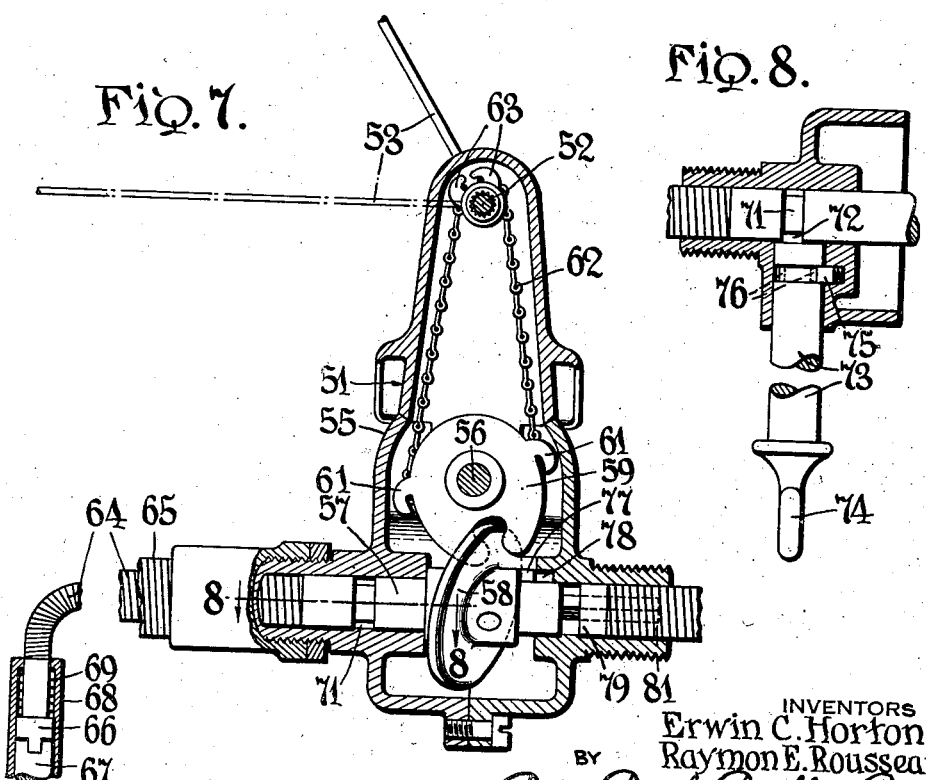

Patented Oct. 7, 1941

2,258,010

UNITED STATES PATENT OFFICE 2,258,010

WINDSHIELD CLEANER

Erwin C. Horton, Hamburg, and Raymon E. Rousseau, Buffalo, N. Y., assignors to Trico Products Corporation, Buffalo, N. Y.

Application September 30, 1938, Serial No. 232,630

9 Claims. (Cl. 15—255)

This invention relates to window cleaners, and particularly to an improvement in cleaners of the general type used for cleaning the windshields or other windows of motor vehicles.

According to the present invention plural wipers are caused to traverse the same surface of the window, preferably over the primary field of vision through such window, moving in different paths, to effect an improved cleaning action. Streaks or ridges of foreign matter left on the windshield in the wake of one wiper are dispersed and the matter carried away by another wiper which moves angularly to the path of motion of the first wiper.

The invention further contemplates means for operating such wipers in such manner that there will be no interference between them although they traverse the same surface, and also means for arresting the motion of both wipers out of the primary field of vision through the window.

These and other objects and advantages will appear from the following description of the typical embodiments of the invention shown in the accompanying drawings, wherein:

Fig. 1 is an elevational view of a window structure provided with a pair of suction operated cleaners, embodying the invention;

Figs. 2, 3, 4 and 5 are diagrammatic views of the motors of the two cleaners shown in Fig. 1, each figure showing the motors in a different phase of operation;

Fig. 6 is an elevational view of a window structure provided with a pair of mechanically driven wipers, the system embodying the invention;

Fig. 7 is a vertical sectional view illustrating parts of the operating assembly shown in Fig. 6; and Fig. 8 is a fragmentary horizontal sectional view taken along line 8—8 of Fig. 7.

Mounted adjacent the upper edge of window 11 is a wiper shaft 12 carrying a wiper arm 13 and wiper blade 14, the latter being movable upon angular oscillation of the shaft 12 in an arcuate path upon the surface of the window between lines A and B, from a substantially horizontal position to the right of shaft 12 to a substantially horizontal position to the left of shaft 12, and return. The shaft may be supported by any suitable means (not shown) and may be driven by a motor 15 through any suitable drive. In the embodiment shown a flexible chain 16 engaging a drive shaft 17 of the motor and the shaft 12, constitutes the drive for the latter.

A similar, but inverted, mechanism is mounted adjacent the lower edge of the window, comprising wiper shaft 22, wiper arm 23, wiper blade 24, motor 25 with drive shaft 27 and chain drive 26. The wiper 24 upon angular oscillation of wiper shaft 22 by motor 25 will move from a horizontal position to the left of shaft 22 to a horizontal position to the right thereof, upon the surface of window 11 in an arcuate path indicated by lines C and D.

Each motor, 15 and 25, is operated by suction and has an automatic valve action (operated by the motor by any suitable mechanism, not illustrated herein) for controlling operation of the other motor, and for such operation there is provided a conduit 28 extending to a suitable source of suction, such as the intake of an internal combustion engine, conduit 28 having branches 29 and 31 extending to motors 15 and 25 respectively, and conduits 32, 33, 34 and 35 extending between the motors.

Motor 15 has a vane type piston 36 movable in the motor chamber thereof about the axis of drive shaft 17 to which it is secured, and the automatic valve action of the motor includes a valve 37 movable on valve seat 38, assuming the position shown in Fig. 2 when vane 36 is moved to its terminal operating position to the left, and assuming the position shown in Fig. 4 when the vane is moved to its terminal operating position to the right. Valve 37 always covers a port, in valve seat 38, which communicates with the branch suction conduit 29, and when in the position shown in Fig. 2 covers a port to conduit 34 and uncovers a port leading to conduit 33, so that the latter is open to the atmosphere and conduit 34 is placed in fluid communication with suction conduit 29. When valve 37 is in the position shown in Fig. 4, conduit 34 is opened to the atmosphere and conduit 33 is placed in communication with conduit 29.

Conduit 33 opens into the operating chamber of motor 25 on the right side of vane piston 39 of motor 25 which is secured to motor shaft 27, and conduit 34 opens into the chamber on the left side of vane 39.

Motor 25 has an automatic valve 41 movable on a valve seat 42 which places conduit 32 in communication with suction conduit branch 31 and opens conduit 35 to the atmosphere when vane 39 reaches its terminal position to the right, shown in Fig. 2, and when the vane reaches its terminal position to the left, shown in Fig. 4, the valve opens conduit 32 to the atmosphere and places conduit 35 in fluid communication with suction conduit branch 31.

Conduit 32 opens into the operating chamber of motor 15 to the left of vane 36, and conduit 35 into the chamber to the right of the vane.

During operation, which may be started or stopped by a control valve 43 in conduit 28, starting with the position shown in Fig. 2, atmospheric air will be present on the right face of vane 36 (via conduit 35) and suction on the left face of vane 36 (via conduit 32, valve 41 and conduits 31 and 28) so that the vane of motor 15 will for the time being be held in the terminal position shown in Fig. 2. Motor 25 will operate vane 39 moving to the left to the position shown in Fig. 3, since atmospheric air will press against its right face (entering the motor via conduit 33) and suction will be exerted on its left face (via conduit 34, valve 37 and conduits 29 and 28).

When the terminal position shown in Fig. 3 is reached by vane 39, valve 41 will move to the position there shown, so that motor 15 (moving from the position of Fig. 3 to that of Fig. 4) will now operate by reason of the reversal of atmospheric pressure and suction to opposite faces of vane 36. Motor 25 will remain inoperative during this action of motor 15 until the latter reaches the condition shown in Fig. 4, when valve 37 will move to the left, reversing the suction and atmospheric connections to motor 25 and causing its vane 39 to move from the position shown in Fig. 4 to that shown in Fig. 5. Consequent reversal of valve 41 will result in movement to the right of the vane 36 of motor 15 bringing the parts to the initial position shown in Fig. 2.

It will thus be understood that motors 15 and 25 will operate at the same frequency, but in out of phase relation, one moving while the other is in a terminal position and stationary, thereby preventing interference of wipers 14 and 24, although the latter are caused to traverse the same surface of the window (bounded by lines A and C), moving in different and angularly related paths.

In the form of the invention shown in Figs. 6 to 8 inclusive, a transmission unit 45 having a wiper shaft 46 is mounted adjacent the upper edge of window 47, for oscillating a wiper arm 48 and wiper blade 49 in an arcuate path over the surface of the window. Mounted adjacent the lower edge of the window is a transmission unit 51 having a wiper shaft 52 for oscillating a wiper arm 53 and wiper blade 54. Both wipers traverse the primary field of vision of the window, but wiper 54 moves ahead of wiper 49 sufficiently so that they do not interfere with each other.

Transmission unit 51, shown in detail in Figs. 7 and 8, includes a casing 55 journalling wiper shaft 52, a rock shaft 56, and a rotating shaft 57. The latter carries a wobble plate 58 engaged by a yoke 59 mounted on rock shaft 56, the yoke having lugs 61 meshing with a chain 62 which also meshes with lugs 63 extended from wiper shaft 52. The parts preferably are so related that one revolution of shaft 57 and wobble plate 58 will result in one complete oscillation of wiper 54, from a horizontal position on one side of shaft 52 to a horizontal position on the opposite side of the shaft and return.

Shaft 57 is connected for rotation to a flexible drive shaft 64 which extends through a housing cable 65 to one member 66 of a clutch, the other member 67 of the clutch being rotated by an engine or other suitable drive means. A housing 68 around the clutch contains a spring 69 which urges clutch member 66 into engagement with member 67.

A groove 71 in shaft 57 receives an eccentric pin 72 extended from a control shaft 73 (Fig. 8) which carries a handle 74. Rotation of shaft 73 through one half turn will shift shaft 57 to the right, pulling the flexible drive shaft 64 sufficiently to disengage the clutch 66, 67 against the resistance of spring 69, thereby stopping the mechanism. Reverse rotation of shaft 73 will, of course, cause operation of the mechanism. In either operating or stopped position the shaft 73 is releasably held by a spring pressed detent 75 which is engageable in recesses 76 formed in the shaft.

In order to insure the mechanism stopping with the wiper in a predetermined position the rotating shaft 57 is provided with a stop 77 engageable with a recess 78 formed in a shoulder within casing 55. In this way movement of shaft 57 to the right is permitted only at the instant that the stop 77 is aligned with the recess 78, at which time the wiper arm 53 will be in approximately the position shown in Fig. 7.

Movement of the shaft 57 to the right, into stopped position, will result in shifting of wobble plate 58, causing arm 53 to move from the position shown to the dotted line position wherein it is substantially horizontal and out of the field of vision through the window.

Splined to the right end of shaft 57 is a member 79 secured for rotation to a flexible drive shaft 81 extending through a housing cable 82 to transmission unit 45 at the top of the window, the shaft 81 operating the wiper shaft 46 through mechanism of substantially the same kind as that employed to operate wiper shaft 46, except that the wobble plate in transmission 45 is not shiftable axially, since it is so related to plate 58 that arm 48 is substantially horizontal, in a terminal position, when arm 53 is in the position shown in full lines in Fig. 7.

Due to this relationship, the lower wiper will always lead the upper wiper (or the reverse, if desired) so that although both traverse the same principal field of vision of the windshield, moving in angularly related paths, they will not interfere; and by the means disclosed the wipers, although mechanically driven from a common drive in out of phase relationship, will, when stopped, both be out of the field of vision.

We claim:

1. In combination with a window, a wiper shaft adjacent one edge of the window, a second wiper shaft adjacent another edge of the window, wipers upon said shafts movable upon angular oscillation of the shafts over a common surface portion of the window constituting a primary field of vision through said window, motor operated means for oscillating the first wiper shaft, motor operated means for oscillating the second wiper shaft, and means relating the last two mentioned means for causing said means to oscillate the shafts at the same frequency and in out-of-phase relation to each other to avoid interference of the wipers upon said common surface portion of the window.

2. In combination with a window, a wiper shaft adjacent one edge portion of the window, a second wiper shaft adjacent another edge of the window, wipers upon said shafts movable upon angular oscillation of the shafts over a common surface portion of the window, a fluid pressure motor for oscillating the first wiper shaft, another fluid pressure motor for oscillating the second wiper shaft, and means relating said motors for causing them to oscillate the shafts in out-of-phase relation to each other to avoid interference of the wipers upon said common surface portion.

3. In combination with a window and a power operated cleaner therefor, a first wiper movable in an arcuate path upon the surface of the window, the axis of motion being adjacent an edge portion of the window, a second wiper movable upon said surface in an arcuate path substantially angularly to and intersecting the first mentioned arcuate path and the axis of motion of the second wiper being adjacent a substantially opposing edge portion of the window, power operated means for oscillating the first wiper in said arcuate path, power operated means for oscillating the second wiper in said arcuate path, and means relating said power operated means for causing them to oscillate the wipers at the same frequency and in out-of-phase relation to each other.

4. In combination with a window, a wiper shaft adjacent one edge of the window, a second wiper shaft adjacent another edge of the window, wipers upon said shafts movable over a common surface portion of the window upon angular oscillation of the shafts, power operated means for oscillating one of said shafts, power operated means for oscillating the other of said shafts, and means relating said power operated means for causing one of the power operated means to move one shaft while the other shaft is in a terminal position to thereby avoid interference of the wipers.

5. In combination with a window, a wiper shaft adjacent one edge of the window, a second wiper shaft adjacent another edge of the window, wipers upon said shafts movable upon angular oscillation of the shafts over a common surface portion of the window, and a suction motor for angularly oscillating each of said shafts, each of said motors having valve means operated thereby for controlling the other motor whereby one motor will be in a terminal position while the other motor operates.

6. In combination with a window, a wiper shaft adjacent one edge of the window, a second wiper shaft adjacent another edge of the window, wipers upon said shafts movable upon angular oscillation of the shafts over a common surface portion of the window, a common drive for said shafts for oscillating them in out-of-phase relation with one another at the same frequency, and means for stopping said drive when one of the shafts is in a terminal position and for simultaneously shifting the other shaft relative to the drive to bring said other shaft into a terminal position.

7. In a window cleaner, a pair of wiper shafts adapted by angular oscillation, a common drive for said shafts for angularly oscillating them in out-of-phase relation at the same frequency, and means for stopping said drive and substantially simultaneously angularly moving one of said shafts relative to the drive and to the other shaft.

8. In a window cleaner, a pair of wiper shafts, drive means for angularly oscillating said shafts in out-of-phase relation at the same frequency, and means for stopping said oscillation of said shafts and for moving one of the shafts angularly relative to the other shaft.

9. In a window cleaner, a pair of wiper shafts, drive means for angularly oscillating said shafts in out-of-phase relation at the same frequency, and means for stopping said oscillation of the shafts when one of them is in a terminal position and moving the other shaft angularly to a terminal position.

ERWIN C. HORTON.
RAYMON E. ROUSSEAU.